(12) United States Patent
Williams

(10) Patent No.: US 11,709,701 B2
(45) Date of Patent: Jul. 25, 2023

(54) ITERATIVE LEARNING PROCESSES FOR EXECUTING CODE OF SELF-OPTIMIZING COMPUTATION GRAPHS BASED ON EXECUTION POLICIES

(71) Applicant: PayPal, Inc., San Jose, CA (US)

(72) Inventor: David Williams, Aptos, CA (US)

(73) Assignee: PAYPAL, INC., San Jose, CA (US)

( * ) Notice: Subject to any disclaimer, the term of this patent is extended or adjusted under 35 U.S.C. 154(b) by 514 days.

(21) Appl. No.: 16/732,029

(22) Filed: Dec. 31, 2019

(65) Prior Publication Data
US 2021/0200575 A1 Jul. 1, 2021

(51) Int. Cl.
*G06F 9/46* (2006.01)
*G06N 20/00* (2019.01)

(52) U.S. Cl.
CPC ............ *G06F 9/463* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2007/0282475 A1* | 12/2007 | Schmidt | G05B 19/41865 700/99 |
| 2013/0110764 A1* | 5/2013 | Wilf | G06F 16/283 707/600 |
| 2018/0046505 A1* | 2/2018 | Saga | G06N 20/00 |
| 2018/0181390 A1* | 6/2018 | Lepcha | G06F 9/4843 |
| 2018/0210530 A1* | 7/2018 | Kwon | G06F 1/3206 |
| 2018/0365063 A1* | 12/2018 | Dattaray | G06F 9/505 |
| 2020/0097333 A1* | 3/2020 | Jain | G06F 9/52 |
| 2020/0249998 A1* | 8/2020 | Che | G06N 3/0454 |

* cited by examiner

*Primary Examiner* — Bradley A Teets
*Assistant Examiner* — Zujia Xu
(74) *Attorney, Agent, or Firm* — Haynes and Boone, LLP

(57) ABSTRACT

A method includes receiving code of an application, the code structured as a plurality of instructions in a computation graph that corresponds to operational logic of the application. The method also includes processing the code according to an iterative learning process. The iterative learning process includes determining whether to adjust an exploration rate associated with the iterative learning process based on a state of a computing environment. Additionally, the process includes executing the plurality of instructions of the computation graph according to an execution policy that indicates certain instructions to be executed in parallel. The process also includes determining an execution time for executing the plurality of instructions of the computation graph according to the execution policy and based on the execution time and the exploration rate, adjusting the execution policy to reduce the execution time in a subsequent iteration.

19 Claims, 5 Drawing Sheets

ITERATIVE LEARNING PROCESSES FOR EXECUTING CODE OF SELF-OPTIMIZING COMPUTATION GRAPHS BASED ON EXECUTION POLICIES

BACKGROUND

Technical Field

This disclosure relates generally to computer processing and, more specifically, to self-optimizing computation graphs for parallel processing.

Description of the Related Art

When developers write code for an application, the developer may wish to determine whether certain parts of the code can be executed in parallel at run-time. However, various factors affect this decision, including the state of the computing environment (e.g., number of processors, processing core, memory, workload, etc.), which can vary greatly from system to system. Developers typically manually write the code in such a way as to statically adhere to certain rules regarding when to execute certain parts of the code in parallel.

Figure 1:
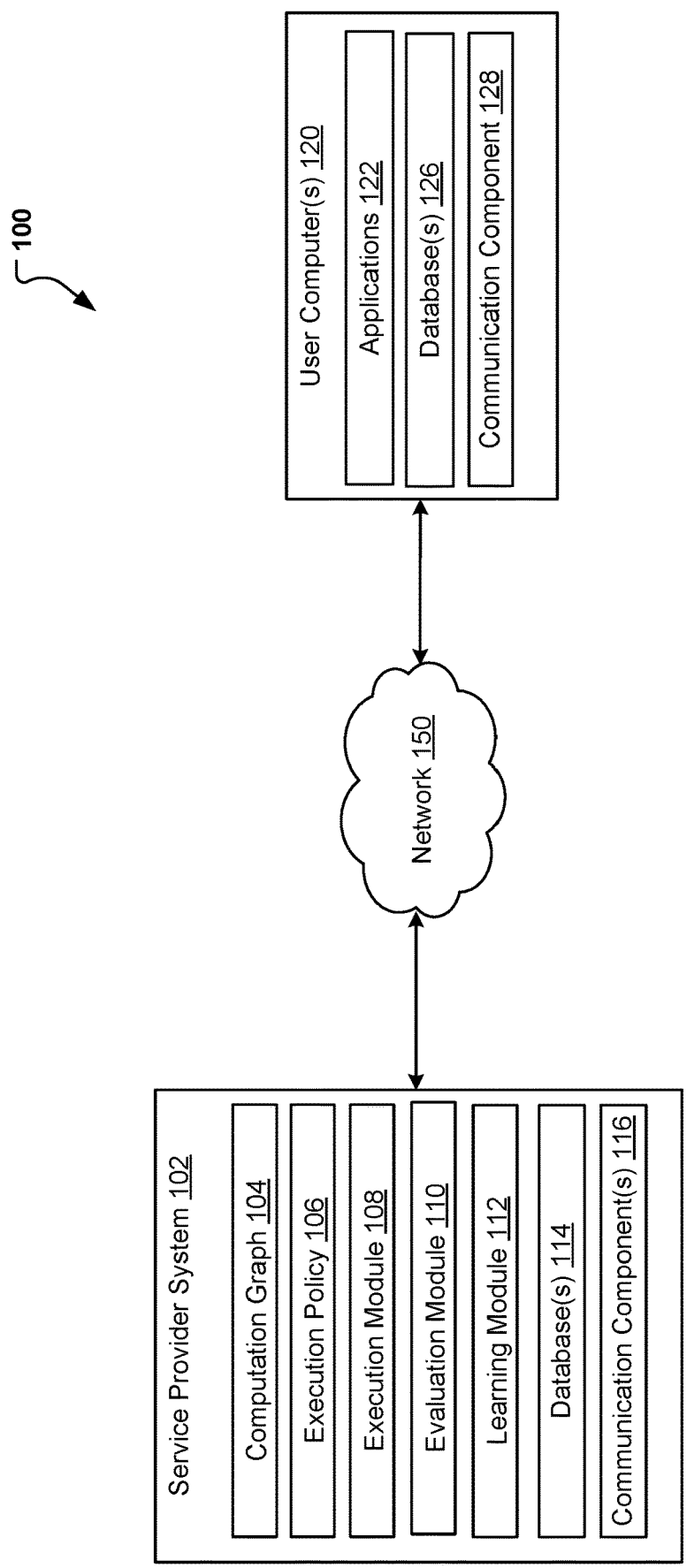
FIG. 1 is a block diagram illustrating an example system for implementing self-optimizing computation graphs, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "account selection module" "configured to select and/or identify one or more accounts" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for implementing self-optimizing computation graphs. A service provider system maintained by a service provider is configured to receive code for an application in which the code is structured as instructions in a computation graph. A computation graph may be direct graph in which nodes are variable or operations on those variables. The service provider system may process the code according to an iterative learning process in order to determine which portions of the code to process in a parallel, such that overall execution time for executing the code is minimized.

According to a particular embodiment, the iterative learning process is associated with an execution policy and an exploration rate. The execution policy may indicate the way in which the instructions of the computation graph are processed. For example, the execution policy may indicate which subsets of the instructions of the computation graph are to be processed in parallel. The execution policy may also indicate serial dependencies between different subsets of the instructions in which certain subsets of instruction are to be processed serially due to the dependencies. The exploration rate may indicate the extent to which an execution time of the code according to particular execution policy influences adjustments to the particular execution policy in subsequent execution of the code. In other words, the amount and/or size of adjustment to the execution policy is dictated by the exploration rate.

The service provider system also determines a state of the computing environment in which the code of the application is being processed. The state of the computing environment may include, but is not limited to, information associated with a number of processing cores available in the computing environment, an amount of memory in the computing environment, a processing workload being experienced by the computing environment, a number of applications running in the computing environment, and/or the like. Based on the state of the computing environment, the service provider system may be configured to determine whether to adjust the exploration rate of the iterative learning process.

For example, the service provider system may determine whether the state of the computing environment is different than the state of a previous computing environment. The differences may be a result of a change in the number of processing cores, an amount of memory, processing load, a number of applications being run, and/or the like. If one or more differences are detected, the service provider system may increase the exploration rate to enable a wider range of adjustments to the execution policy. According to certain embodiments, the amount by which the exploration rate is increased may be based on the degree of differences between the state of the computing environment and its previous state. For instance, the more components between the two states of the computing environments that have been changed, the greater the service provider system may increase the exploration rate.

The service provider system is further configured to execute the instructions of the computation graph according to the execution policy. According to a particular embodiment, the execution policy may indicate a first subset of the instructions to be executed in parallel with a second subset of the instructions Upon completing execution of the instructions in the computation graph (e.g., the code of the application), the service provider system may determine a corresponding execution time. Based on the execution time and the exploration rate associated with the iterative learning process, the service provider system may adjust the execution policy.

The adjustment to the execution policy may include changes to which subsets of the instructions of the computation graph are to be executed in parallel. For example, the adjustment may result in the execution policy indicating that a third subset of the instructions are the be processed in parallel with a fourth subset of the instructions. As another example, the adjustment may result in the execution policy indicating that the first subset of the instructions is now to be executed serially with the second subset of the instructions. It will be appreciated that the adjustments described are merely examples, and that any type of adjustments that change which portions of the computation graph to executed in parallel are possible.

Additionally, the service provider system is configured to decrease the exploration rate in response to performing the adjustments to the execution policy. Thus, as adjustments to the execution policy are made in each iteration of the iterative learning process, the exploration rate may be decayed by the service provider system according to a decay rate. The decay rate may be predetermined or may be dynamically adjusted based on the performance of the iterative learning process. For example, if the execution time in successive iterations of the iterative learning process has not decreased by a threshold amount, the service provider system may reduce the decay rate.

Eventually, the exploration rate may be reduced by service provider system to a near 0 amount, at which point subsequent adjustments to the execution policy may be minimal or non-existent, and the execution time for executing the computation graph may be optimized.

FIG. 1 is a block diagram illustrating an example system 100 to protect against password spraying. In the illustrated embodiment, the system 100 includes a service provider system 102, maintained by a service provider, in communication with other computer(s) 120 via a network 150. It will be appreciated that the service provider system 102 may include one or more computers, servers, and/or other devices, and that the modules included in the service provider system 102 may be executed by any combination of those devices.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, service provider system 102 may include a computation graph 104, an execution policy 106, an execution module 108, an evaluation module 110, a learning module 112, database(s) 114, and communication components 116. Each of the components of the service provider system 102 may communicate with each other to perform an iterative learning process to optimize execution of an application represented by the computation graph 104, as will be described in more detail below.

The computation graph 104 may be a set of computer-executable instructions corresponding to code of an application that is to be run by the service provider system 102. The computation graph 104 describes the operational logic of the application and may be executed by the execution module 108. Certain subsets of the instructions of the computation graph may be parallelized to reduce the time needed to execute the computation graph.

As such, the execution policy 106 may indicate which subsets of the instructions of the computation graph are to be executed in parallel and which subsets of the instructions are to be executed serially. As will be described further below, the execution policy may be adjusted by the learning module 112 based on certain evaluations.

Figure 3:
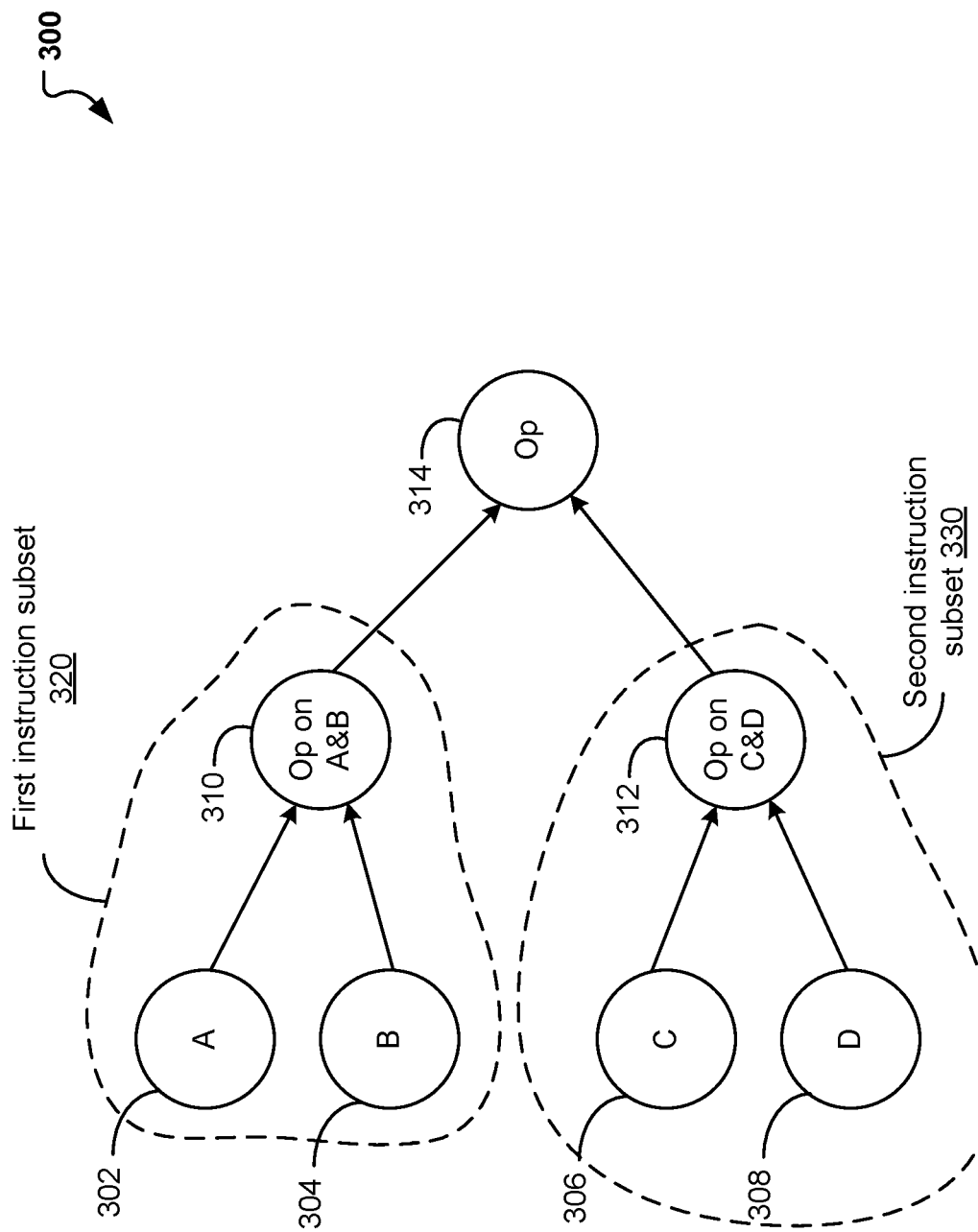
FIG. 3 is a diagram illustrating an example computation graph, according to some embodiments.

For example, FIG. 3 illustrates an example computation graph 300. The computation graph 300 depicts input variable A 302 and input variable B 304 as inputs into operation 310. The computation graph 300 further illustrates input variable C 306 and input variable D 308 as inputs into operation 312. The output of operation 310 and the output of operation 312 are in turn inputs into operation 314.

As shown in computation graph 300, operation 310 on input variable A 302 and input variable B 304 may be included in a first instruction set 320, and operation 312 on input variable C 306 and input variable D 308 may be included in a second instruction set 330. Since the first instruction set 320 and the second instruction set 330 do not share dependencies with each other (e.g., in neither input variables nor operations), the execution policy 106 may indicate that they are to be executed in parallel. It will be appreciated that the computation graph 300 illustrated in FIG. 3 is a simplified form of an actual computation graph and that various other combination of variables, operations, dependencies, and instruction sets are possible.

The execution module 108 may be configured to execute the computation graph 104 according to the execution policy 106. The execution module 108 may be configured to instruct and/or otherwise cause hardware processors (e.g., hardware processor cores) of the service provider system 102 to execute certain subsets of the instructions of the computation graph 104 in parallel, according to the execution policy 106.

Upon execution of the instructions of the computation graph 104 by the execution module 108, the evaluation module 110 is configured to determine an execution time corresponding to execution of the computation graph 104. In certain embodiments, the evaluation module 110 is configured to record the execution time corresponding to various stages of executing the computation graph 104, such as respective execution times of different subsets of instructions of the computation graph 104 (e.g., execution times of different combinations of nodes in the computation graph 104).

The learning module 112 is configured to adjust the execution policy 106 based on various criteria. According to a particular embodiment, the learning module 112 is configured to adjust the execution policy 106 based on the execution time of executing the instructions of the computation graph 104 for a particular iteration of the iterative learning process. For instance, the learning module 112 have access to the respective execution times of different subsets of the instructions. Based on the respective execution times, the learning module 112 may adjust the execution policy 106 such that the predicted execution time may be reduced in a subsequent iteration of executing the computation graph 104 according to the adjusted execution policy 106. In some embodiments, the learning module 112 adjusts the execution policy 106 in real-time as the evaluation module 110 determines the respective execution times of each of the subsets of instructions.

The adjustment to the execution policy 106 may include changes to which subsets of the instructions of the computation graph 104 are to be executed in parallel. For example, the execution policy 106 may indicate that a first subset of the instructions of the computation graph 104 are to be executed in parallel with a second subset of instructions of the computation graph 104. Further, the adjustment may result in the execution policy 106 indicating that a third subset of the instructions are the be processed in parallel with a fourth subset of the instructions. As another example, the adjustment may result in the execution policy 106 indicating that the first subset of the instructions is subsequently to be executed serially with the second subset of the instructions. It will be appreciated that the adjustments described are merely examples, and that any type of adjustments that change the portions of the computation graph 104 that are to be executed in parallel are possible.

According to certain embodiments, in an initialization phase of the iterative learning process (e.g., when the execution graph 104 is being executed for the first time and/or first number of times), the learning module 112 may adjust the execution policy 106 randomly so as to create sample data points from which to make more informed adjustments in subsequent iterations. The number of iterations for which the learning module 112 performs random adjustments to the execution policy 106 may be a predetermined setting.

Furthermore, the degree to which the learning module 112 adjusts the execution policy 106 may be determined by an exploration rate associated with the iterative learning process. In certain embodiments, a greater exploration rate increases the likelihood that the learning module 112 will adjust the execution policy 106 based on the execution time of the computation graph 104 for the particular iteration. Further, a greater exploration rate may also increase the amount of adjustments the learning module 112 perform (e.g., the number of adjustments to the subsets of instructions to be run in parallel). Conversely, a lower exploration rate decreases the likelihood that the learning module 112 will adjust the execution policy 106 based on the execution time of the computation graph 104 for the particular iteration. Further, a lower exploration rate may also decrease the amount of adjustments the learning module 112 performs (e.g., the number of adjustments to the subsets of instructions to be run in parallel).

In a particular embodiment, after each iteration of the execution module 108 executing the instruction of the computation graph 104, the learning module 112 decreases the exploration rate by a predetermined amount. Over time, the learning module 112 reduces the exploration rate to a near zero value, and further adjustments to the execution policy 106 may be minimal and/or may be terminated. In certain cases, the exploration rate is reduced below a threshold rate, the execution policy 106 at that point in time may be designated as a final execution policy for the current state of the computing environment. The state of the computing environment is described further below.

Certain events may cause the module to increase the exploration rate. For instance, the learning module 112 may increase the exploration rate based on a current state of the computing environment. As such, the learning module 112 may determine a current state of the computing environment in which the instructions of the computation graph 104 (e.g., the code of the application) is being executed. The state of the computing environment may correspond to information describing a number of processing cores available in the computing environment, an amount of memory in the computing environment, a processing workload being experienced by the computing environment, a number of applications running in the computing environment, and/or the like.

Additionally, the learning module 112 may determine, for each iteration of the iterative learning process, whether the current state of the computing environment is different than the state of a previous computing environment (e.g., the computing environment in a previous iteration of the iterative learning process). The differences may be a result of a change in the number of processing cores, an amount of memory, processing load, a number of applications being run, and/or the like. If one or more differences are detected, the learning module 112 may increase the exploration rate to enable a wider range of adjustments to the execution policy 106 to account for the change. According to certain embodiments, the amount by which the exploration rate is increased may be based on the degree of differences between the state of the computing environment and its previous state. For instance, the more components between the two states of the computing environments that have been changed, the greater the learning module 112 may increase the exploration rate.

The database(s) 114 stores various information that may include, for example, identifiers (IDs) such as operating system registry entries, cookies, IDs associated with hardware of the communication component 116, IDs used for payment/user/device authentication or identification, card IDs and transaction information associated with the card IDs, and/or other appropriate IDs. Further, the database 114 may store login credentials (e.g., such as to login to an account with the service provider and/or other accounts with other service providers), identification information, biometric information, and/or authentication information of the user the applications 122 connect to the service provider system 102 to access.

The communication component 116 may be configured to communicate with various other devices, such as the user computer(s) 120 and/or other devices. In various embodiments, communication component 14 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

FIG. 1 further illustrates the user computer(s) 120, each of which includes applications 122, database 126, and communication component 128. As previously discussed, the applications 122 may be any type of application that access the service provider system 102. According to a particular embodiment, the applications are user applications for a payment service provider that communicates with the service provider system 102.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
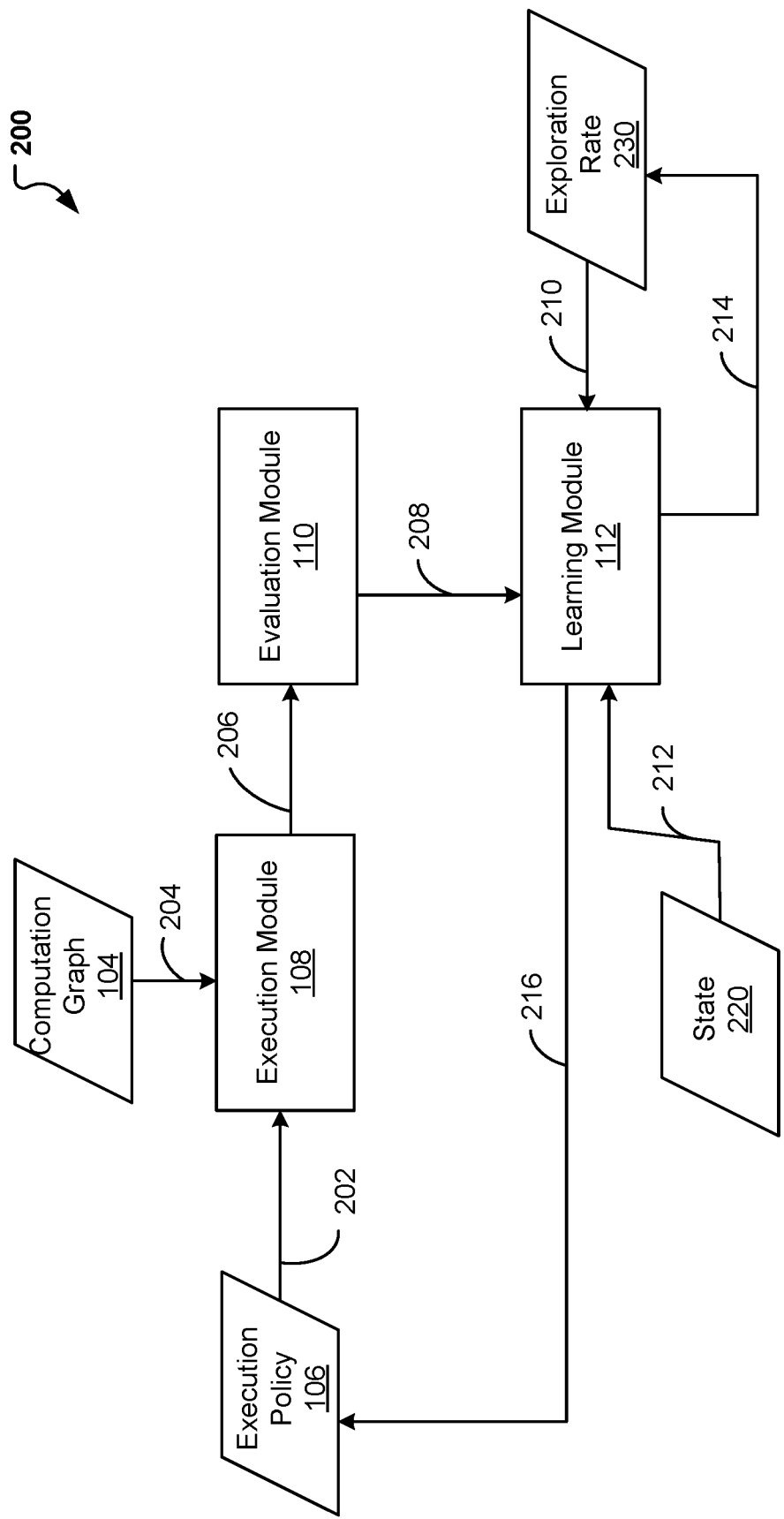
FIG. 2 is a diagram illustrating a data flow for self-optimizing computation graphs, according to some embodiments.

FIG. 2 illustrates a data flow diagram 200 for a implementing a self-optimizing computation graph according to an iterative learning process, in accordance with a particular embodiment. As shown in FIG. 2, at step 202, the execution policy 106 may be provided to the execution module 108. At step 204, the computation graph 104 may be provided to the execution module 108.

The execution module 108 executes the set of instructions defining the computation graph 104, and at step 206, the evaluation module 110 determines an execution time for executing the computation graph 104. At step 208, the evaluation module 110 provides the execution time to the learning module 112 At step 210, the current exploration rate 230 associated with the iterative learning process is provided to the learning module 112. At step 212, the current state of the computing environment 220 is provided to the learning module 112.

At step 214, the learning module 112 adjusts the exploration rate 230. The exploration rate 230 may be increased based on a determined a difference between the current state of the computing environment 220 and a state of the computing environment in a previous iteration. If no such difference is detected by the learning module 112, the exploration rate 230 may be decreased. At step 216, the learning module 112 adjusts the execution policy 106 based on the execution time and the exploration rate 230.

Figure 4:
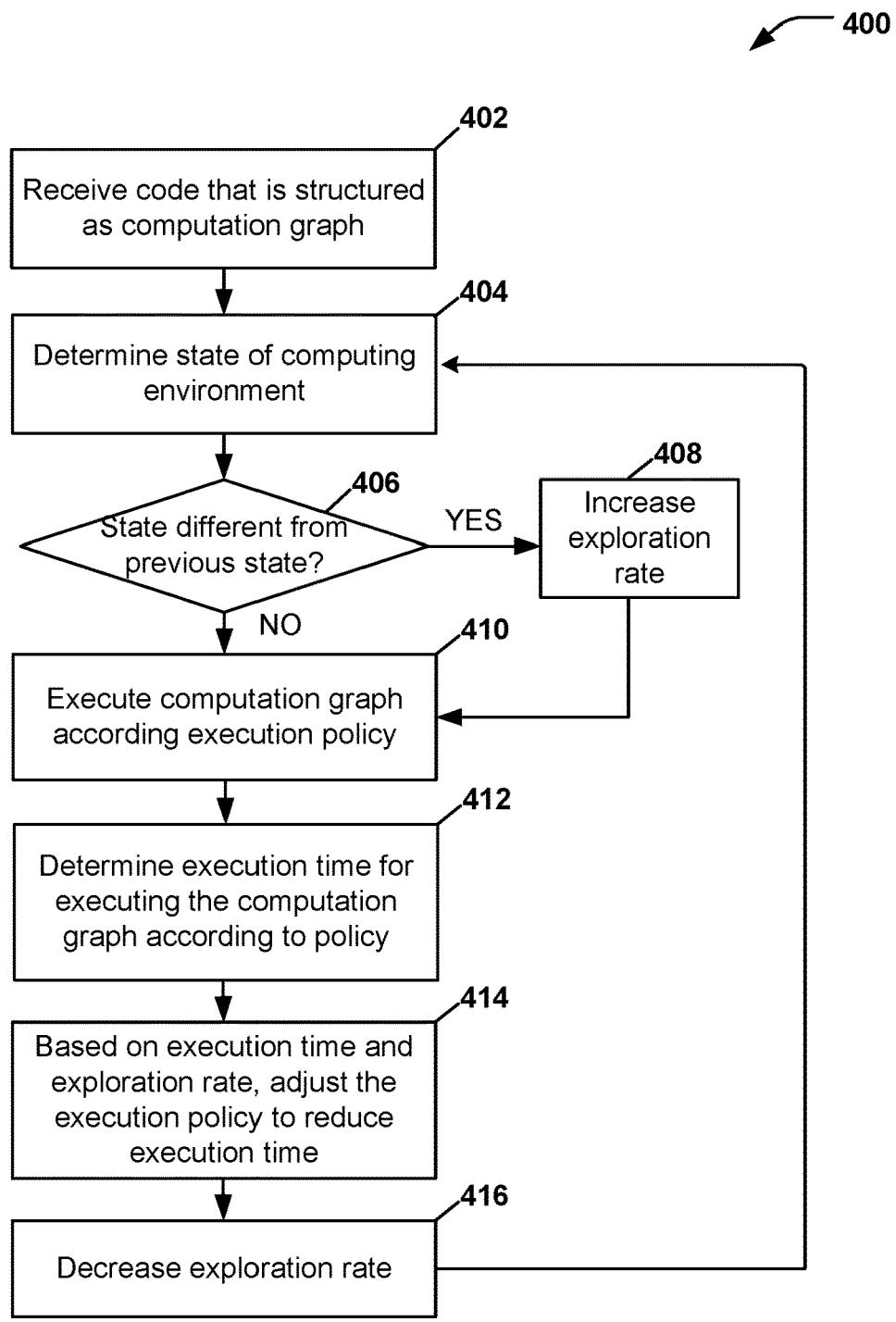
FIG. 4 illustrates a flow diagram that depicts a method for self-optimizing computation graphs, according to some embodiments.

FIG. 4 illustrates a flow diagram of a method 400 for a self-optimizing computation graph using an iterative learning process, in accordance with one or more particular embodiments. The method 400 may be performed by a service provider system, such as the service provider system 102. The method 400 beings at step 402, where the service provider system receives code that is structure as a computation graph.

At step 204, the service provider system determines a state of the computing environment. At step 206, the service provider system determines if the state of the computing environment is different from a previous state in a previous iteration of the iterative learning process. If so, the method 400 proceeds to step 408, wherein the service provider system increases an exploration rate associated with the iterative learning process.

At step 410, the service provider system executes the computation graph according to an execution policy. At step 412, the service provider system determines an execution time corresponding to the execution of the computation graph according to the execution policy. At step 414, the service provider system adjusts the execution policy based on the execution time and the exploration rate. At 416, the service provider system decreases the exploration rate by a predetermined amount. The method 400 then proceeds back to step 404.

Example Computing Device

Figure 5:
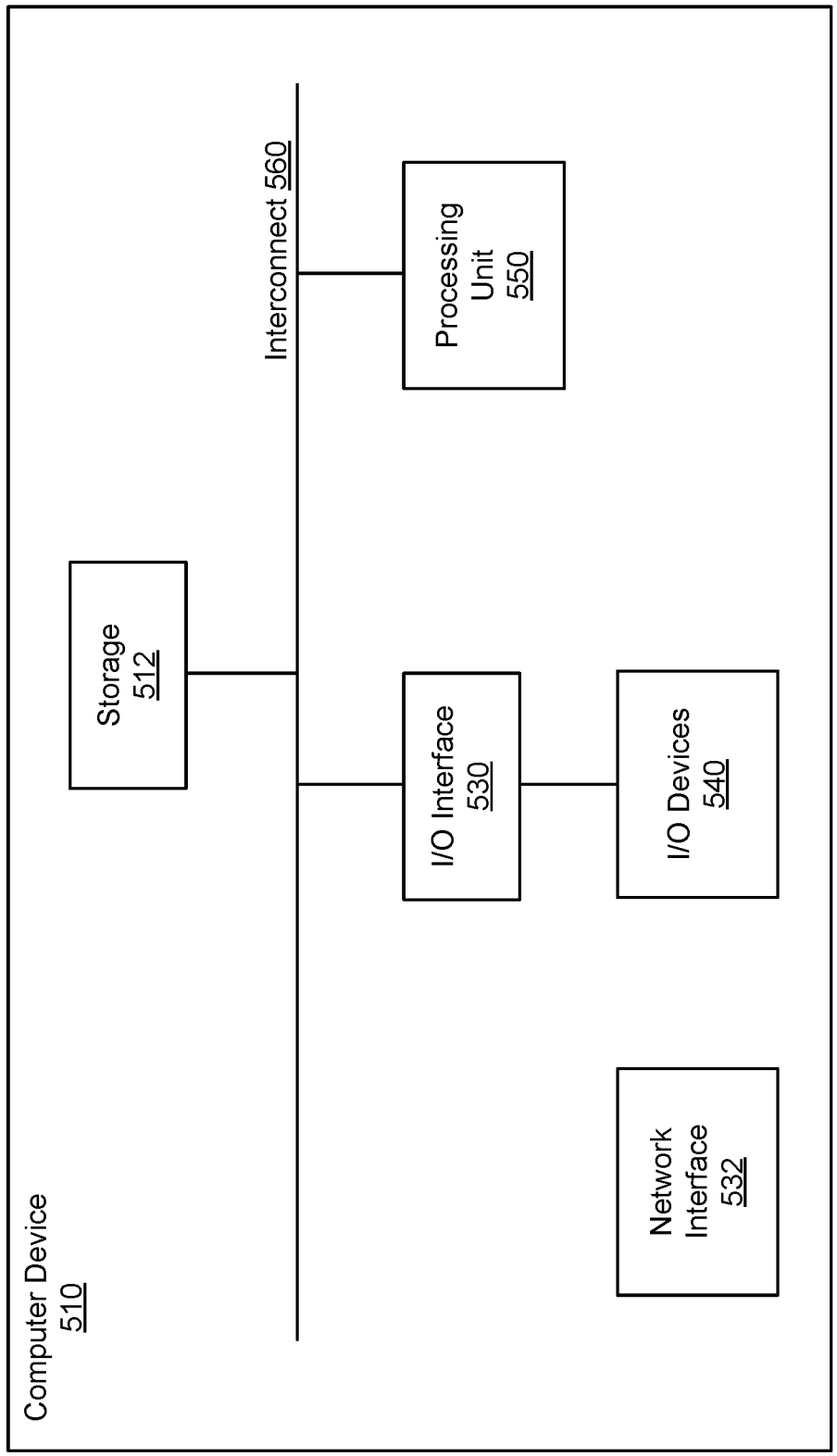
FIG. 5 is a block diagram illustrating an exemplary computing device, according to some embodiments.

Turning now to FIG. 5, a block diagram of one embodiment of computing device (which may also be referred to as a computing system) 510 is depicted. Computing device 510 may be used to implement various portions of this disclosure including any of the components illustrated in FIG. 1 and FIG. 2A-C. Computing device 510 may be any suitable type of device, including, but not limited to, a personal computer system, desktop computer, laptop or notebook computer, mainframe computer system, web server, workstation, or network computer. As shown, computing device 510 includes processing unit 550, storage 512, and input/output (I/O) interface 530 coupled via an interconnect 560 (e.g., a system bus). I/O interface 530 may be coupled to one or more I/O devices 540. Computing device 510 further includes network interface 532, which may be coupled to network 520 for communications with, for example, other computing devices.

In various embodiments, processing unit 550 includes one or more processors. In some embodiments, processing unit 550 includes one or more coprocessor units. In some embodiments, multiple instances of processing unit 550 may be coupled to interconnect 560. Processing unit 550 (or each processor within 550) may contain a cache or other form of on-board memory. In some embodiments, processing unit 550 may be implemented as a general-purpose processing unit, and in other embodiments it may be implemented as a special purpose processing unit (e.g., an ASIC). In general, computing device 510 is not limited to any particular type of processing unit or processor subsystem.

Storage subsystem 512 is usable by processing unit 550 (e.g., to store instructions executable by and data used by processing unit 550). Storage subsystem 512 may be implemented by any suitable type of physical memory media, including hard disk storage, floppy disk storage, removable disk storage, flash memory, random access memory (RAM- SRAM, EDO RAM, SDRAM, DDR SDRAM, RDRAM, etc.), ROM (PROM, EEPROM, etc.), and so on. Storage subsystem 512 may consist solely of volatile memory, in one embodiment. Storage subsystem 512 may store program instructions executable by computing device 510 using processing unit 550, including program instructions executable to cause computing device 510 to implement the various techniques disclosed herein.

I/O interface 530 may represent one or more interfaces and may be any of various types of interfaces configured to couple to and communicate with other devices, according to various embodiments. In one embodiment, I/O interface 530 is a bridge chip from a front-side to one or more back-side buses. I/O interface 530 may be coupled to one or more I/O devices 540 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A system, comprising:
one or more hardware processors; and
at least one memory storing computer-executable instructions, that in response to execution by the one or more hardware processors, causes the system to perform operations comprising:
receiving code of an application, the code structured as a plurality of instructions in a computation graph that corresponds to operational logic of the application;
processing the code according to an iterative learning process, each iteration of the iterative learning process comprising:
determining that a state of a computing environment in which the code is being processed is different from a previous state of the computing environment in a previous iteration of the iterative learning process based on at least one of a processing workload of the computing environment or a number of applications running in the computing environment;
determining whether to adjust an exploration rate associated with the iterative learning process based on the state of the computing environment being different, wherein the exploration rate indicates an amount of an adjustment to an execution policy of the code based on a difference in the state of the computing environment from the at least one of the processing workload or the number of the applications running in the computing environment, and wherein the execution policy includes an execution time associated with the exploration rate;
increasing the exploration rate in response to the determining that the state of the computing environment is different from the previous state;
executing the plurality of instructions of the computation graph according to the execution policy, the execution policy indicating a first subset of the plurality of instructions to be executed in parallel with a second subset of the plurality of instructions;
determining the execution time for executing the plurality of instructions of the computation graph according to the execution policy;
based on the execution time and the exploration rate, adjusting the execution policy to reduce the execution time in a subsequent iteration, the adjusted execution policy indicating whether the first subset is to be executed in parallel or in series with the second subset based on the exploration rate; and
decreasing the exploration rate based on the adjusted execution policy and a decay rate that is dynamically adjusted based on the iterative learning process, the decreased exploration rate not below a minimum amount that is allowable for the processing the code;
terminating, based on the decay rate and the processing the code according to the iterative learning process, further adjustments to the execution policy in response to the exploration rate being at or below a threshold amount; and
determining, based on the iteratively processing the code and the terminating, a final execution policy.

2. The system of claim 1, wherein the execution policy further indicates one or more serial dependencies or one or more parallel dependencies between different subsets of the plurality of instructions.

3. The system of claim 1, wherein a first iteration of the iteratively learning process occurs prior to a second iteration of the iterative learning process, the first iteration associated with a first execution time that is greater than a second execution time associated with the second iteration.

4. The system of claim 1, wherein the operations further comprise:
determining the previous state of the computing environment during the previous iteration based on a change to at least one of processing components, an available memory, or executing application processes in the computing environment.

5. The system of claim 1, wherein the operations further comprise:
    determining the state of the computing environment based on at least one of a number of processing cores in the computing environment or an amount of memory included in the computing environment.

6. The system of claim 1, wherein the final execution policy identified in response to determining that the exploration rate is below a threshold rate.

7. The system of claim 1, wherein the adjusting the execution policy further comprises:
    indicating different subsets of the plurality of instructions to be executed in parallel.

8. A method, comprising:
    receiving code of an application, the code structured as a plurality of instructions in a computation graph that corresponds to operational logic of the application;
    processing the code according to an iterative learning process, each iteration of the iterative learning process comprising:
        determining that a state of a computing environment in which the code is being processed is different from a previous state of the computing environment in a previous iteration of the iterative learning process based on a number of processing cores in the computing environment;
        changing an exploration rate in response to the determining that the state of the computing environment is different from the previous state;
        executing the plurality of instructions of the computation graph according to an execution policy in the state of the computing environment being different, wherein the execution policy indicates a first subset of the plurality of instructions to be executed in parallel with a second subset of the plurality of instructions;
        determining an execution time for executing the plurality of instructions of the computation graph in the state of the computing environment;
        based on the execution time and the exploration rate associated with the iterative learning process, adjusting the execution policy to reduce the execution time in a subsequent iteration, the adjusted execution policy indicating whether the first subset is to be executed in parallel or in series with the second subset based on the exploration rate, wherein the exploration rate indicates an amount of an adjustment to the execution policy of the code in the execution policy based on a difference in the state of the computing environment from the number of the processing cores, and wherein the execution policy includes the execution time associated with the exploration rate; and
        decreasing the exploration rate based on the adjusted execution policy and a decay rate that is dynamically adjusted based on the iterative learning process, the decreased exploration rate not below a minimum amount that is allowable for the processing the code;
    determining, based on the decay rate and the processing the code according to the iterative learning process, an optimization threshold for the execution policy has been met or exceeded when the exploration rate is at or near a zero amount; and
    determining, based on the iteratively processing the code and the determining that the optimization threshold has been met or exceeded, a final execution policy.

9. The method of claim 8, further comprising:
    determining whether to adjust the exploration rate associated with the iterative learning process based on the state of the computing environment.

10. The method of claim 9, further comprising:
    determining the previous state of the computing environment during the previous iteration based on a change to at least one of processing components, available memory, or executing application processes in the computing environment.

11. The method of claim 9, further comprising:
    responsive to the determining that the state of the computing environment is different from the previous state, increasing the exploration rate associated with the iterative learning process.

12. The method of claim 9, wherein the state of the computing environment comprises information associated with at least one of an amount of memory included in the computing environment, a number of applications running in the computing environment, or a workload of the computing environment.

13. The method of claim 9, wherein the adjusting the execution policy further comprises:
    indicating different subsets of the plurality of instructions to be executed in parallel.

14. The method of claim 8, wherein the execution policy further indicates one or more serial dependencies or one or more parallel dependencies between different subsets of the plurality of instructions.

15. A non-transitory computer readable medium storing computer-executable instructions that in response to execution by one or more hardware processors, causes a system to perform operations comprising:
    receiving code of an application, the code structured as a plurality of instructions in a computation graph that corresponds to operational logic of the application;
    processing the code according to an iterative learning process, each iteration of the iterative learning process comprising:
        determining that a state of a computing environment in which the code is being processed is different from a previous state of the computing environment in a previous iteration of the iterative learning process based on an amount of memory included in the computing environment;
        modifying an exploration rate based on the state of the computing environment being different from the previous state;
        executing the plurality of instructions of the computation graph according to an execution policy in the state of the computing environment, the execution policy indicating a first subset of the plurality of instructions to be executed in parallel with a second subset of the plurality of instructions;
        determining an execution time for executing the plurality of instructions of the computation graph in the state of the computing environment;
        based on the execution time and the exploration rate associated with the iterative learning process, adjusting the execution policy to reduce the execution time in a subsequent iteration, the adjusted execution policy indicating whether the first subset is to be executed in parallel or in series with the second subset based on the exploration rate, wherein the exploration rate indicates an amount of an adjustment to the execution policy of the code in the execution policy based on a difference in the state of the computing environment from the amount of the memory, and wherein the execution policy includes the execution time associated with the exploration rate; and decreasing the exploration rate based on the adjusted execution policy and a decay rate that is dynamically adjusted based on the iterative learning process, the decreased exploration rate not below a minimum amount that is allowable for the processing the code;

optimizing, based on the decay rate and the iteratively processing the code according to the iterative learning process, the execution policy in response to the exploration rate approaching or being at the minimum amount, wherein the optimizing reduces additional adjustments to the execution policy; and determining, based on the processing the code and the optimizing, a final execution policy.

16. The non-transitory computer readable medium of claim 15, wherein the operations further comprise:

determining whether to adjust the exploration rate associated with the iterative learning process based on the state of the computing environment.

17. The non-transitory computer readable medium of claim 16, wherein the operations further comprise:

determining the previous state of the computing environment during the previous iteration based on a change to at least one of processing components, available memory, or executing application processes in the computing environment.

18. The non-transitory computer readable medium of claim 16, wherein the operations further comprise:

responsive to the determining that the state of the computing environment is different from the previous state, increasing the exploration rate associated with the iterative learning process.

19. The non-transitory computer readable medium of claim 15, wherein a first iteration of the iteratively learning process occurs prior to a second iteration of the iterative learning process, the first iteration associated with a first execution time that is greater than a second execution time associated with the second iteration.

* * * * *

UNITED STATES PATENT AND TRADEMARK OFFICE
CERTIFICATE OF CORRECTION

| | |
|---|---|
| PATENT NO. | : 11,709,701 B2 |
| APPLICATION NO. | : 16/732029 |
| DATED | : July 25, 2023 |
| INVENTOR(S) | : David Williams |

It is certified that error appears in the above-identified patent and that said Letters Patent is hereby corrected as shown below:

In the Claims

Claim 15, Column 12, Line 46, change "modifying an exploration rate" to --modifying the exploration rate--.

Signed and Sealed this
Nineteenth Day of September, 2023

*Katherine Kelly Vidal*
Katherine Kelly Vidal
*Director of the United States Patent and Trademark Office*